United States Patent
Ketharaju et al.

(10) Patent No.: US 12,086,806 B1
(45) Date of Patent: *Sep. 10, 2024

(54) UNIQUE IDENTIFICATION OF CUSTOMER USING AN IMAGE

(71) Applicant: Wells Fargo Bank, N.A., San Francisco, CA (US)

(72) Inventors: Rameshchandra Bhaskar Ketharaju, Hyderabad (IN); Hemakumar Madabathula, Hyderabad (IN); Aditya Kishore Jonnalagadda, Hyderabad (IN); Saipavan K. Cherala, Hyderabad (IN); Ramanathan Ramanathan, Bellevue, WA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/807,007

(22) Filed: Jun. 15, 2022

Related U.S. Application Data

(63) Continuation of application No. 16/783,585, filed on Feb. 6, 2020, now Pat. No. 11,392,950, which is a continuation of application No. 15/274,572, filed on Sep. 23, 2016, now Pat. No. 10,558,976.

(51) Int. Cl.
*G06Q 20/40* (2012.01)
*H04L 9/40* (2022.01)

(52) U.S. Cl.
CPC ... *G06Q 20/40145* (2013.01); *H04L 63/0861* (2013.01)

(58) Field of Classification Search
CPC .......... G06Q 20/40145; H04L 63/0861; H04L 63/083; H04L 63/0838; H04L 9/3231
See application file for complete search history.

(56) References Cited

U.S. PATENT DOCUMENTS

| | | | |
|---|---|---|---|
| 7,734,490 B2 | 6/2010 | Cimral et al. | |
| 8,085,992 B1 | 12/2011 | Sahin et al. | |
| 9,058,627 B1 | 6/2015 | Wasser et al. | |
| 2002/0013720 A1 | 1/2002 | Ozono et al. | |
| 2009/0128670 A1* | 5/2009 | Noh ......................... | H04N 1/58 348/241 |

(Continued)

OTHER PUBLICATIONS

M. N. Doja et al. "Image authentication schemes against key-logger spyware," 2008, pp. 574-579. (Year: 2008).*

(Continued)

*Primary Examiner* — Luu T Pham
*Assistant Examiner* — Canh Le
(74) *Attorney, Agent, or Firm* — Merchant & Gould P.C.

(57) ABSTRACT

A method for authenticating an individual for login to a server computer includes receiving at the server computer data for a first authentication image from an electronic computing device. First attributes are identified of one or more similar geometrical shapes from the data for the first authentication image. A determination is made as to whether the first attributes of the one or more similar geometrical shapes from the data for the first authentication image correspond to second attributes from a second authentication image accessible on or by the server computer. When the first attributes correspond to the second attributes, the individual is authenticated on the server computer.

18 Claims, 8 Drawing Sheets

(56) References Cited

U.S. PATENT DOCUMENTS

| | | |
|---|---|---|
| 2009/0235267 A1 | 9/2009 | Mckinney et al. |
| 2010/0271466 A1* | 10/2010 | Newton ............... H04N 13/189 |
| | | 348/51 |
| 2011/0181617 A1 | 7/2011 | Tsuda et al. |
| 2011/0316980 A1* | 12/2011 | Dubbelman ......... G06V 10/757 |
| | | 348/47 |
| 2012/0130869 A1 | 5/2012 | Shergill et al. |
| 2012/0130870 A1 | 5/2012 | Shergill et al. |
| 2012/0278155 A1 | 11/2012 | Faith |
| 2012/0310516 A1 | 12/2012 | Zeng |
| 2013/0139076 A1* | 5/2013 | Mochizuki ................ G06F 8/38 |
| | | 715/763 |
| 2013/0328912 A1* | 12/2013 | Najarian .................. G09G 5/14 |
| | | 345/619 |
| 2014/0164198 A1* | 6/2014 | Caldwell ................ G06Q 40/00 |
| | | 705/35 |
| 2015/0134568 A1 | 5/2015 | Riggs |
| 2015/0373020 A1 | 12/2015 | Hale et al. |
| 2016/0036798 A1* | 2/2016 | Mulhearn ........... H04W 12/065 |
| | | 726/7 |
| 2016/0335483 A1 | 11/2016 | Pfursich et al. |
| 2017/0372056 A1 | 12/2017 | Narasimhan |

OTHER PUBLICATIONS

Riyad Dhuny et al., "An Open Framework Framework to Geotag and Locate Plants Around the World," 2015, pp. 153-158. (Year: 2015).*

M. N. Doja et al. "Image authentication schemes against ley-logger spyware," 2008, pp. 574-579. (Year: 2008).

Riyad Dhuny et al., "An Open Framework to Geotag and Locate Plants Around the World," 2015, pp. 153-158. (Year: 2015).

* cited by examiner

UNIQUE IDENTIFICATION OF CUSTOMER USING AN IMAGE

BACKGROUND

An individual typically needs to be authenticated by a computer system before an electronic transaction can be processed. Similarly, the individual is typically authenticated before accessing an account on the computer system.

A common method of authenticating an individual who is performing an electronic transaction is to use a magnetic strip or an electronic chip on a payment card to provide identification information for the individual. A common method of authenticating an individual who accesses an account is to have the individual enter a user ID and a password. However, techniques such as magnetic strips, electronic chips, user ID's, passwords and other traditional techniques can be insufficient to prevent illegal access and fraud.

SUMMARY

Embodiments of the disclosure are directed to a method implemented on a server computer for authenticating an individual for login to the server computer, the method comprising: at the server computer, receiving data for a first authentication image from an electronic computing device; identifying first attributes of one or more similar geometrical shapes from the data for the first authentication image; determining whether the first attributes of the one or more similar geometrical shapes from the data for the first authentication image correspond to second attributes from a second authentication image accessible on or by the server computer; and when the first attributes correspond to the second attributes, authenticating the individual on the server computer.

In another aspect, a method implemented on a first electronic computing device for generating an authentication image for an individual comprises: accessing information regarding the individual, the information including electronic transaction data for a plurality of purchases made by the individual; creating an image comprising a plurality of bubble objects, each bubble object being based on the information regarding the individual, one or more of the plurality of bubble objects being based on the electronic transaction data; and sending attribute data corresponding to the plurality of bubble objects to a second electronic computing device.

In yet another aspect, a server computer comprises: a processing unit; and system memory, the system memory including instructions which, when executed by the processing unit, cause the server computer to: receive data for a first authentication image from an electronic computing device; identify first attributes of one or more circular shapes from the data for the first authentication image, at least one of the one or more circular shapes representing an asset of an individual, at least one of the one or more circular shapes representing a liability for the individual and at least one of the one or more circular shapes representing one or more electronic transactions for an individual; determine whether the first attributes of the one or more circular shapes from the data for the first authentication image matches second attributes from a second authentication image accessible on or by the server computer, a determination of whether the first attributes matches the second attributes comprising: determine whether first positional coordinates for each of the one or more circular shapes from the data of the first authentication image matches second positional coordinates of the one or more circular shapes from the data of the second authentication image; determine whether first timestamps for each of the one or more circular shapes from the data of the first authentication image matches second timestamps of the one or more circular shapes from the data of the second authentication image; determine whether first global positioning system (GPS) coordinates for one or more of the one or more circular shapes from the data of the first authentication image matches corresponding second GPS coordinates of the one or more circular shapes from the data of the second authentication image; and determine whether first sizes for each of the one or more circular shapes from the data of the first authentication image matches second sizes of the one or more circular shapes from the data of the second authentication image; and when the first attributes match the second attributes, authenticate the individual on the server computer.

The details of one or more techniques are set forth in the accompanying drawings and the description below. Other features, objects, and advantages of these techniques will be apparent from the description, drawings, and claims.

DETAILED DESCRIPTION

Figure 1:
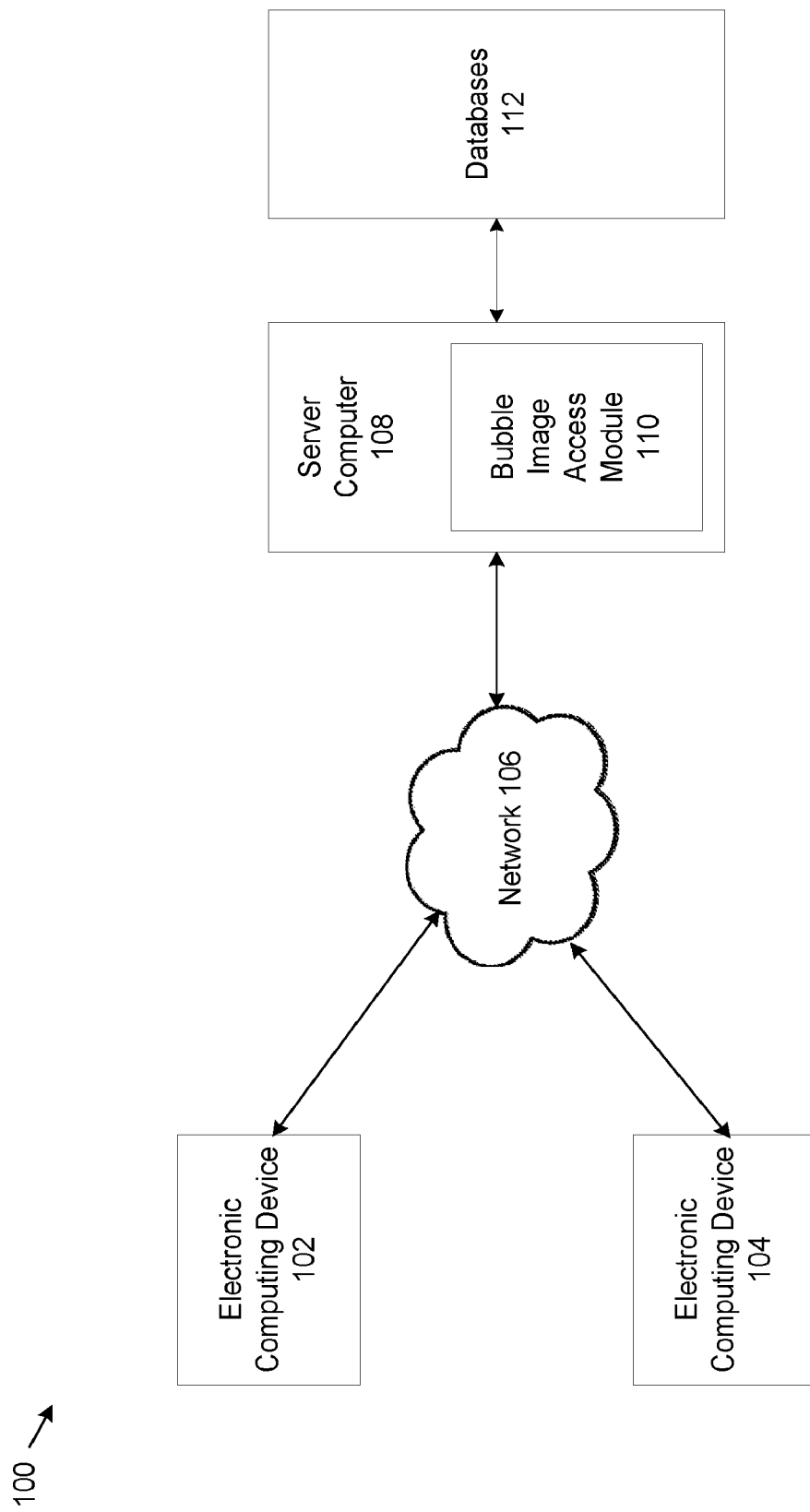
FIG. 1 shows an example system that supports unique identification of a customer using a bubble object image.

The present disclosure is directed to systems and methods that provide a unique method of authenticating an individual.

In examples described herein, an image-based authentication mechanism, referred to as "bubble object image" is used to provide for the unique identification of the individual. As used in this disclosure, the bubble object image is a unique image that comprises one or more bubble objects. As used in this disclosure, a bubble object is a shape that is embedded with or associated with information related to the individual. The information related to the individual can comprise personal information regarding the individual, such as a name, address and social security number, information regarding one or more electronic transactions, such as purchases made by the individual, information regarding values of assets held by the individual, such as cars, homes, financial securities, bank accounts, personal property, etc., information regarding liabilities of the individual, including mortgages, car loans and other personal loans, credit card balances, household expenses and other types of information. The bubble objects can typically be circular in shape, but can also include other shapes such as squares, rectangles, triangles and ellipses.

Using the systems and methods, a unique image comprising one or more bubble objects can be generated for the individual by a server computer, transformed dynamically with secured encryption and sent to a personal device of the individual, such as a smartphone. The image can be stored on the smartphone and used as a password to access the individual's personal account on the server computer or provide authentication information when conducting a financial transaction using the smartphone. For example, the individual can display the unique image on the smartphone and have the image scanned by a reader at a point of sale (POS) device or at a kiosk. The POS device can send the image to the server computer along with any transaction data. The server computer can compare the image with one stored on the server computer and when the images match, the individual can be authenticated for the financial transaction.

In another aspect using the systems and methods, the unique image can be dynamic. For example, as discussed in more detail later herein, for each new electronic transaction (e.g., a purchase) using the smartphone and the unique image, the unique image can be updated with data from the electronic transaction. The updated unique image can be stored on the server computer, transformed dynamically with secured encryption and also sent to the smartphone. All new electronic transactions using the smartphone and all new attempts at accessing the individual's accounts at the server computer are then authenticated with the updated unique image.

In yet another aspect using the systems and methods, the unique image can convey information regarding the individual's financial health. As explained in more detail later herein, the unique image can be divided into four quadrants. Bubble objects corresponding to the individual's assets can be located in one quadrant and bubble objects corresponding to the individual's liabilities can be located in another quadrant. In addition, the bubble object for assets can be of a different color or shading than the bubble objects for liabilities. In some implementations, bubble objects can blink or flash to indicate an asset or liability that may need attention, for example a mortgage payment that is past due or delinquent. Further, an outer circumference of the unique image (for example, the outer circumference of a circle) can vary in thickness or color corresponding to a degree of assets over liabilities or liabilities over assets. For example, when assets are shown in a green color and when liabilities are shown in a red color, the color of the outer circumference of the unique image can displayed as green when individual's assets are greater than the individual's liabilities and displayed as red with the individual's liabilities are greater than the individual's assets. A thickness of the circumference can indicate the degree to which the individual's assets are greater than the individual's liabilities or the degree to which the individual's liabilities are greater than the individual's assets.

In yet another aspect using the systems and methods, the unique image can be scanned by a reader and displayed to the individual on the individual's smartphone or other personal device. The reader can specify what the assets and liabilities are and can provide detail regarding the assets and liabilities. In addition, when the unique image is displayed on the smartphone, the individual can display a history of electronic transaction data over time. The individual can drill down on a bubble object representing an electronic transaction and view details of the electronic transaction. In an example implementation, bubble objects corresponding to up to a predetermined number of electronic transactions can be included in the unique image. In this example, the predetermined number of electronic transactions is ten. When newer electronic transactions are made, the newer electronic transactions can be placed near the center of the unique image and the bubble objects for older electronic transactions can be moved further away from the center. When bubble objects are displayed for ten electronic transactions (or another predetermined number of electronic transactions) bubble objects for new electronic transactions can replace bubble objects for the oldest electronic transactions being displayed. The predetermined number of electronic transactions (ten in this example) is user configurable based on business rules.

The systems and methods disclosed herein are directed to a computer technology that can provide a dynamic method to uniquely identify an individual for authenticating a login to an electronic computing device and for securely processing an electronic transaction for the individual. The systems and methods address and provide a novel solution for an existing problem in computer technology—reliably authenticating an individual. By creating a bubble object image based on the individual's personal data and current financial data, the systems and methods can provide an image that can uniquely identify the individual. Further, by periodically creating updated bubble object images based in part on random financial events, such as electronic purchases or other electronic transactions by the individual, and using the bubble object images to authenticate the individual, the systems and methods lesson the possibility that a secure authentication can be compromised.

FIG. 1 shows an example system 100 that supports unique identification of a customer using a bubble object image. The example system 100 includes an electronic computing device 102, an electronic computing device 104, a network 106 a server computer 108 and databases 112. Server computer 108 includes a bubble image access module 110. More, fewer or different components can be used.

The example electronic computing device 102 is an electronic computing device that can support a secure login to a server computer. The electronic computing device 102 can be one of a desktop computer, a laptop computer, a tablet computer, a smartphone or a wearable electronic computing device. Electronic computing device 102 can also be an Internet of Things (IoT) device with edge analytic capabilities. For example system 100, the example electronic computing device 104 is a mobile electronic computing device such as a smartphone, a tablet computer or an IoT device with edge analytic capabilities. In addition to supporting a secure login to the server computer 108, the electronic computing device 104 can be used to perform electronic transactions, such as purchasing products using a point of sale (POS) device or a kiosk. As discussed in more detail later herein, when the electronic computing device 104 is used to perform electronic transactions, a bubble object image that uniquely identifies the customer can be displayed on electronic computing device 104 and scanned at the POS device or the kiosk.

The example network 106 is a computer network, such as the Internet. Electronic computing device 102, electronic computing device 104 and POS devices can connect to or otherwise access server computer 108 via network 106.

The example server computer 108 is a server computer of a financial institution such as a bank. The server computer 108 can support financial accounts and/or electronic transactions for a plurality of customers. For example, the customer can have one or more financial accounts at the financial institution and the customer can access the financial accounts via a secure login to server computer 108. In addition, when the customer uses a smartphone to initiate an electronic transaction at a POS device, server computer 108 can provide authorization for the electronic transaction. More than one server computer can be used.

The example bubble image access module 110 can be used to generate a bubble object image that can identify a customer of the financial institution. The bubble image access module 110 can receive an image containing bubble objects from a customer electronic computing device or from a POS or kiosk device, parse data in the image and generate a numerical bubble code that can uniquely identify the customer. In addition, bubble image access module 110 can generate images containing bubble objects (bubble object images) that can be sent to the customer electronic computing device. The bubble image access module 110 is discussed in more detail later herein.

The example databases 112 can comprise one or more computer databases that can store financial and personal records for customers serviced by the server computer 108. In some implementations, databases 112 can also store rules for generating bubble objects on server computer 108. In other implementations, the rules for generating bubble objects can be stored on server computer 108.

Figure 2:
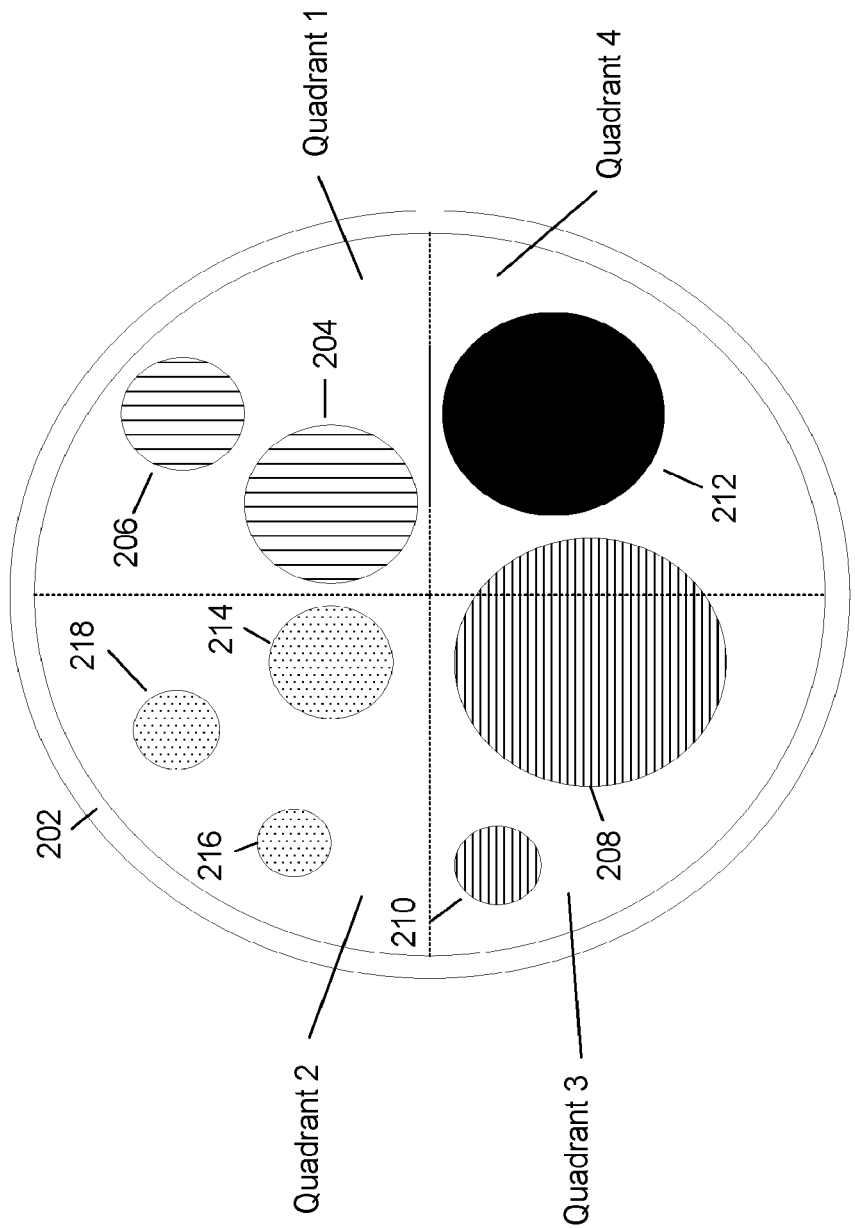
FIG. 2 shows an example bubble object image.

FIG. 2 shows an example bubble object image 200. The bubble object image 200 is circular in shape and comprises four quadrants of a circle. For this disclosure, the upper right quadrant is labeled quadrant 1, the upper left quadrant is labeled quadrant 2, the lower left quadrant is labeled quadrant 3 and the lower right quadrant is labeled quadrant 4. Similar to an X-Y axis of a graph, the center point of the circle has coordinates of 0,0. Quadrant 1 corresponds to positive values on the X and Y axes, quadrant 2 corresponds to negative values on the X axis and positive values on the Y axis, quadrant 3 corresponds to negative values on the X and Y axes and quadrant 4 corresponds to positive values on the X axis and negative values on the Y axis.

Bubble objects can be inserted into one or more of the quadrants. The bubble objects are typically of the same geometric shape, in this case circles. Each bubble object stores information pertaining to the customer. Some examples of information that can be stored in the bubble objects include information regarding assets of the customer (e.g. a home, car, stock, bonds, mutual funds, checking accounts, savings accounts, etc.), liabilities of the customer (e.g. mortgages, personal loans, etc.) profile data regarding the customer (e.g. name, age, address, bank account identifier), purchase transaction data (records of recent customer purchases made via an electronic transaction, such as via a credit card) and other types of information. The details of the information are not always apparent visually, but can be extracted or displayed using a reader device.

In addition to bubble objects representing assets, liabilities, purchase transaction data and customer profile data, bubble objects can include timestamp information and geo location information. For example, bubble objects representing electronic transactions can include timestamp information regarding when a purchase was made and GPS (global positioning system) information regarding a GPS position of the customer when the purchase was made by the customer.

The size of a bubble object on the bubble object image 200, for example the size of bubble objects 204, 206, 212, 208, 210, 214, 216, and 218, can be proportional to a dollar value of a bubble object. For example, a size of bubble objects representing customer assets can be proportional to a dollar value of the assets, a size of bubble objects representing customer liabilities can be proportional to a dollar value of the liabilities and a size of bubble objects representing customer electronic transactions can be proportional to a dollar value of the electronic transactions.

Each bubble object is formed based on a center of the bubble object and a radius. The radius is determined based on information such as assets and liabilities. However, the size of the radius of bubble object image 200 is fixed, so the scale of the size for bubble objects within bubble object image 200 (i.e. for bubble objects 204, 206, 212, etc.) can dynamically change based on values for the bubble objects, such as the dollar value of the assets and liabilities. When the radius of a bubble object is represented in dollars, the radius can be a financial health index value.

As another example, for a bubble object representing customer profile data, personal data for the customer such as a financial account number, a customer social security number and a GPS positon of the customer when the customer opens a financial account at a financial institution, the bubble object can be concatenated or otherwise processed into one bubble code number that can be scaled. A size of the bubble object (for example a circumference of a circle of a bubble object) can be proportional to this number. The radius of the circle can be derived from the circumference. Alternatively, the radius of the circle can be proportional to a time period of how long the customer has established a relationship with the financial institution.

Each bubble object on the bubble object image 200 can be displayed using a color or shading corresponding to a type of the bubble object. For example, as shown in FIG. 2, bubble objects 204 and 206, each representing customer assets, are shown with a vertical line shading, bubble objects 208 and 210, each representing customer liabilities, are shown with a horizontal line shading and bubble objects 214, 216 and 218, each representing customer electronic transactions, are shown with a small dot shading. In addition, customer object 212, representing customer profile information, is shown with solid black shading. Alternatively, customer object 212 can be an invisible bubble object, such as a hologram or a virtual reality readable image, which could be the same radius as customer object 212.

The bubble object image 200 also provides information regarding a time progression of bubble objects. When a bubble object is rendered on the bubble object image 200, the bubble object image is rendered in an appropriate quadrant closest to the center of bubble object image 200, corresponding to a coordinate of 0,0. As time progresses, new bubble objects can be rendered on the bubble object image 200, also starting from a coordinate of 0,0. As explained in more detail later herein, as new bubble objects are rendered on bubble object image 200, previously rendered bubble objects can move away from the center of bubble object image 200 towards the circumference of bubble object image 200. A distance from the center of the bubble object image 0,0 to a tangent on a bubble object can be proportional to time, where the tangent can represent a current date.

Alternatively, in a reverse implementation, a distance from the tangent on the bubble object to the center of the bubble object image could be a radius such that the current time is at the circumference of the bubble object image 200 and not at the center of the bubble object image 200. Designating the current time at the circumference of the bubble object image 200 can help in using the bubble object image 200 with a touch screen enabled IoT device or a wearable electronic computing device. For example, finger gestures such as pinch could be used to zoom into the past. The reverse implementation can improve usability because older transactions can become very small over time as the relationship with the customer progresses.

In addition, different data elements can be normalized into a common scale. The size of the bubble objects can be rescaled to a smaller size as the bubble objects move towards the circumference. However, the radius of the bubble object image 200 generally does not change. Instead bubble objects are rescaled to fit within the bubble object image 200. In addition, even when new bubble objects are not added, the bubble object image 200 can change because over time existing bubble objects can move towards the circumference of bubble object image 200.

Certain bubble objects can be built in layers that can be sometimes by viewed by a three-dimensional display device, such as an Apple watch. For example, one or more bubble objects representing a customer electronic transaction can represent a predetermined number of electronic transactions, for example ten electronic transactions. When the bubble object corresponding to a customer electronic transaction is viewed using the three-dimensional display device, the customer can drill down and view details of each of the customer electronic transactions represented by the bubble object. For example, bubble objects like 214, 216 and 218, each representing customer electronic transactions can be selected to view a predetermined number of transactions (e.g. the last ten transactions). In addition, bubble objects can be nested so that a drilled down bubble object can be drilled down further.

The bubble object image 200 also includes an outer edge 202 which can be rendered in a color or shading that can represent a financial health status for the customer. For example, when bubble object image 200 comprises more assets than liabilities, the outer edge 202 can be rendered in a color or shading representing assets, for example a green color or a vertical line shading. Similarly, when bubble object image 200 comprises more liabilities than assets, the outer edge 202 can be rendered in a color or shading representing liabilities, for example a red color or a horizontal line shading. Further, one or more of the bubble objects of the outer edge 202 can flash, provide audible sounds or provide other effects to indicate a status, for example an asset, liability or electronic transaction that exceeds a threshold limit.

Figure 3:
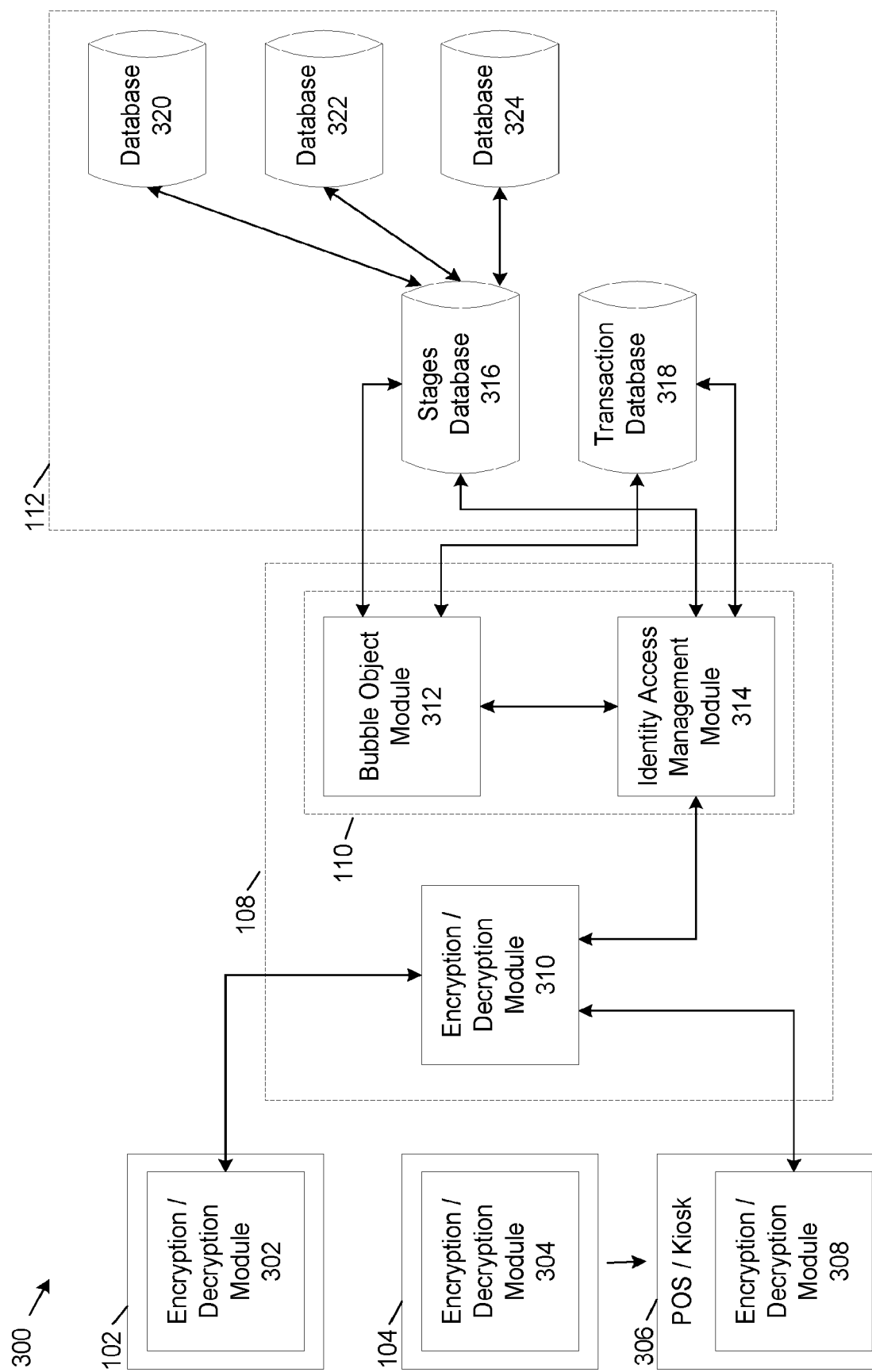
FIG. 3 shows another illustration of the system of FIG. 1.

FIG. 3 shows an example system 300 that shows interactions between components of system 100. The example system 300 includes electronic computing device 102, electronic computing device 104, a POS/kiosk device 306, server computer 108 and databases 112. Electronic computing device 102, electronic computing device 104 and POS/kiosk device 306 can be IoT devices capable of handling smart contracts. For a block chain implementation, server computer 108 can be a validator of smart contracts.

Electronic computing device 102 includes an encryption/decryption module 302, electronic computing device 104 includes an encryption/decryption module 304, POS/kiosk device 306 includes an encryption/decryption module 308, and server computer 108 includes an encryption/decryption module 310. The encryption/decryption modules 302, 304, 308 and 310 can encrypt and decrypt bubble object image data sent between electronic computing device 102, electronic computing device 104, POS/kiosk device 306 and server computer 108.

Server computer 108 also includes bubble image access module 110. Bubble image access module 110 comprises a bubble object module 312 and an identity access management module 314. The example bubble object module 312 can generate an image containing bubble objects that can provide a unique identifier for the customer. The example identity access management module 314 can receive an image that contains bubble objects, parse the image and uniquely identify the customer based on the parsed image.

Databases 112 comprise a plurality of databases including a transaction database 318 and a stages database 316. The example transaction database 318 stores data on electronic transactions, such as purchases, made by the customer. The example stages database 316 can provide an interface to one or more additional databases 320, 322, and 324 that can include personal and financial data for the customer. The transaction database 318 could have a reference database at the device level. Transactional data could also have referential data in databases 320, 322 and 324, where one of the referential data could be GPS data. In some implementations a stages database 316 is not used and personal and financial data can be accessed from one or more of databases 320, 322, 324 or other databases not shown in FIG. 3.

In an example implementation, a customer at electronic computing device 102 can attempt to login to server computer 108. Initially, electronic computing device 102 may not have a bubble object image so the customer can provide a user ID and password to login to server computer 108. When the customer is authenticated based on the user ID and password, the bubble object module 312 can create a bubble object image for the customer and send the bubble object image to electronic computing device 102. Once electronic computing device 102 has the bubble object image, the customer can use the bubble object image instead of the user ID and password to login to the electronic computing device 102.

For an example in which the electronic computing device 104 has the bubble object image and mobile electronic computing device 104 is a smartphone, when the customer makes a purchase using the smartphone, the customer can display the bubble object image on the smartphone and have the bubble object image scanned by POS/kiosk device 306. In one example implementation, the POS/kiosk device 306 can encrypt the bubble object image (using encryption/decryption module 308) and encrypt transaction data for the purchase. The POS device can then send the encrypted bubble object image and transaction data to server computer 108.

Server computer 108 can decrypt the bubble object image (using encryption/decryption module 310) and the transaction data. Server computer can then send the decrypted bubble object image to identity access management module 314. The identity access management module 314 can obtain a bubble object image previously created for the customer from the bubble object module 312. The identity access management module 314 can then compare the decrypted bubble object image received from the smartphone with the previously created bubble object image for the customer from the bubble object module 312. When the two images match, the identity access management module 314 can authenticate the customer. When the customer is authenticated, server computer 108 can authorize the electronic transaction for the customer at POS/kiosk device 306 and can store the decrypted transaction data from the purchase in transaction database 318.

In addition, the transaction data can be used to dynamically modify the previously created bubble object image to create an updated bubble object image for future logins or electronic transactions. For example, the bubble object module 312 can obtain the decrypted transaction data for the purchase from transaction database 318 and use the decrypted transaction data to create an updated bubble object for electronic transactions. As discussed earlier herein, bubble objects can be displayed for a predetermined number of electronic transactions, for example 10 purchases. When a new electronic transaction occurs, a new bubble object can be created for the new electronic transaction. If there are fewer bubble objects representing electronic transactions that the predetermined limit (for example 10 transactions), the new bubble object can be added to the bubble object image. However, if there are already bubble objects corresponding to the predetermined limit, the new bubble object can replace the oldest bubble object representing electronic transactions in the bubble object image. The new bubble object image can then be sent to mobile electronic computing device 104 and used for authentication for all future logins or electronic transactions. The new bubble object image can also be sent to stages database 316 for storage in one of database 320, database 322 or database 324.

In an alternative implementation, instead of POS/kiosk device 306 sending the encrypted bubble object image to server computer 108, POS/kiosk device 306 can parse the bubble object image to extract data fields from the bubble object image, encrypt the data fields and send the encrypted data fields to server computer 108. The encryption/decryption module 310 can then decrypt the parsed data fields and the identity access management module 314 can compare the decrypted, parsed data fields with data fields from the previously created bubble object image for the customer from bubble object module 312. When the data fields match, the identity access management module 314 can authenticate the customer at POS/kiosk device 306. An example of data fields that can be extracted by POS/kiosk device 306 from the scanned bubble object image can include coordinates and radius of each bubble object image, a color or shading for each bubble object image, depth data for bubble object images, geo location data, time stamp data and other data. The depth data can shows a history of the bubble object images when viewed with a three-dimensional reader. For example the three-dimensional reader can provide snapshots of bubble object images over a period of time, each snapshot showing the positions of the bubble objects at a specific time.

In another implementation, multiple transactions can be included in a single bubble object, for example, a bubble object that shows a trading status for an individual may have multiple trading accounts. In this implementation, there can be a depth attribute that can indicate a number layers in the single bubble object, each layer providing details for a specific trading account. The depth data would not be visible on a two-dimensional display, which would only show an overall status. However, on a three-dimensional display, for example on an Apple watch, different depth layers could be selected and details of a trading account at a selected depth layer could be displayed.

In another implementation, an authentication image that includes bubble objects can be generated separately at both individual electronic computing devices and the server computer. In this implementation, both the individual electronic computing devices and the server computer can have a same algorithm for generating bubble object images from data. When both the individual electronic computing devices and the server computer have both the same algorithms and share the same data, they all can generate bubble object images independently of each other. In this case, there would be no need for the server computer to send an updated bubble object image to the electronic computing devices.

Figure 4:
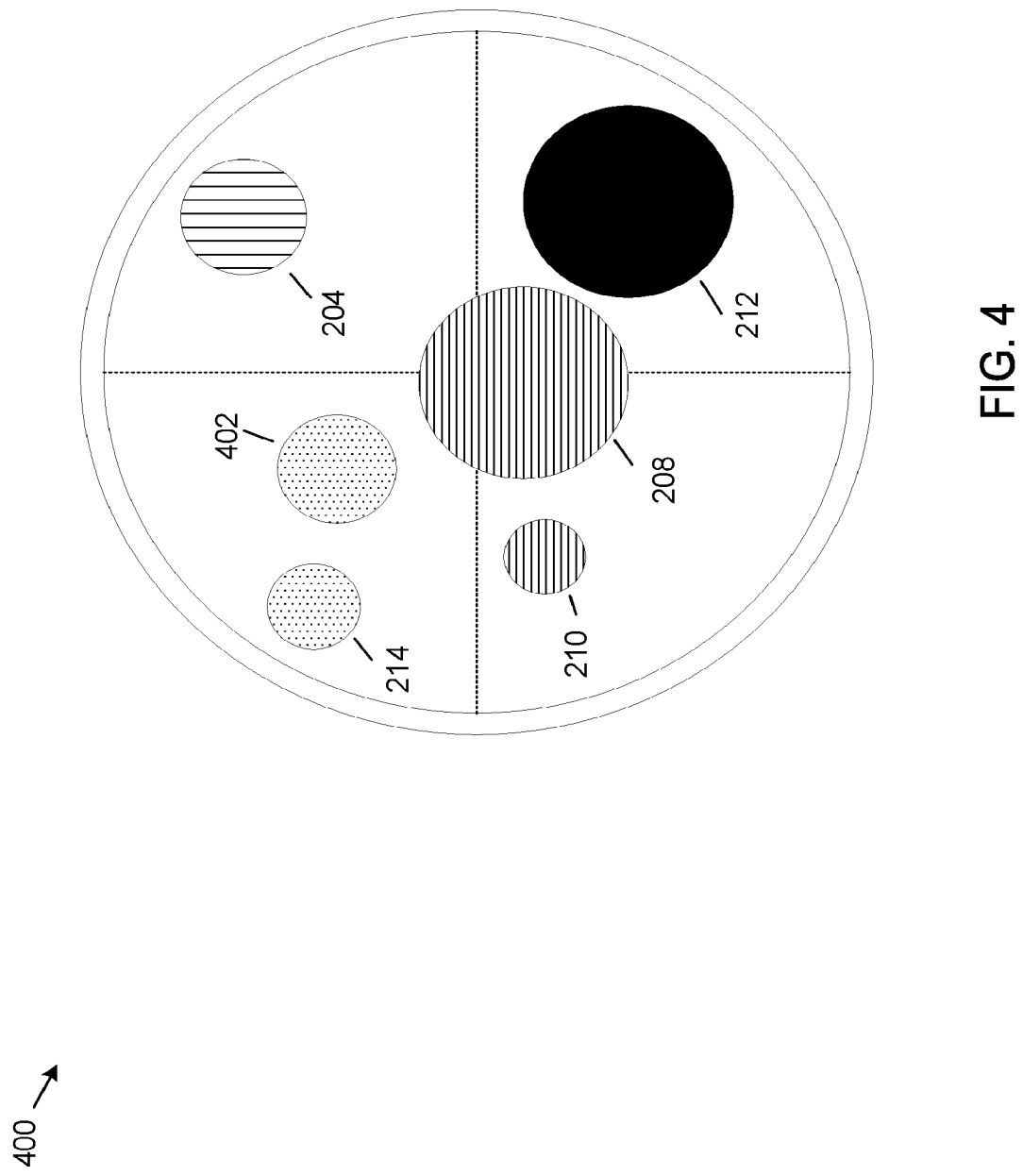
FIG. 4 shows another example bubble object image.

FIG. 4 shows another example bubble object image 400. The example bubble object image 400 shows the bubble object image 200 of FIG. 2 at a later instance of time. As shown in FIG. 3, bubble object 204 has moved away from the center of the bubble object image 400 towards the circumference of the bubble object image 400 and bubble object 206 has been moved off the bubble object image 400. Transaction bubble object 214 has also moved away from the center of the bubble object image 400 and has also become smaller, bubble objects 216 and 218 have moved off bubble object image 400 and new transaction bubble object 402 has been added. In addition, liabilities bubble object 210 has partially moved into quadrant 1, indicating that part of the liabilities bubble object 210 has become an asset. For example, liabilities bubble object 210 could represent a home mortgage and part of the home mortgage could be paid off. In some implementations, instead of having certain bubble objects move off the bubble object image 400 as a function of time, the bubble objects (for example bubble objects 206, 216 and 218) can be rescaled to a smaller scale and moved towards the circumference of bubble object image 400. In these implementations, bubble objects would be moved off of the bubble object image when the number of bubble objects in a specific category exceeds a predetermined limit, for example a limit of ten bubble objects. Alternatively, in a reverse implementation, as discussed earlier herein, older bubble objects can move towards the center of bubble object image 200.

The bubble object image 400 shows how a bubble object image can change over time. When the bubble object image changes, the bubble object image and/or attributes for the bubble object image can be sent to the server computer as a new authentication image for the individual.

As discussed early herein, the systems and methods can support a use case of authentication using a password and a use case of providing authorization for an electronic purchase at a POS or a kiosk. In some implementations, the password can be a one-time password (OTP) that can provide a one-time authentication. The OTP can be configured by the customer or the OTP can be an image of bubble object image 200 or of any other bubble object within bubble object image 200. With an OTP, an updated bubble object image can be generated after the electronic purchase, incorporating transaction data from the electronic purchase. The updated bubble object image can be stored at the server computer and sent back to the individual's smartphone or any customer electronic computing device, including an IoT device, for use as another OTP. The systems and methods can also support other use cases including universal identification, universal login, notification and alerts with blinking patterns, linked profile with family health index and calculation of a health index and displaying as a ring. Other use cases are possible.

The use case of universal identification can comprise using a unique bubble object image to provide identification for an individual. For example, a bubble object image can be generated for the individual based on personal profile data for the individual. The personal profile data can include such attributes as a name, address, social security number and other specific information that can be obtained. A bubble object image that can be generated from this information can be stored in a database than can be accessible from one or more secure access servers. For added security, the generated bubble object image can be combined with a biometric authentication method such as a fingerprint or a retinal scan.

The use case of a universal login is similar to the use case of a one-time password, except that a password used for a universal login can be used more than once. The password for the universal login can be derived from configuration, profile and other information and converted into a bubble object image comprising the configuration, profile and other information. For the universal login, the bubble object image is not periodically updated so that it can be used more than once for login.

For the use case of notification and alerts with blinking patterns, one or more bubble objects can be made to blink or change patterns when a notification or alert is associated with the one or more bubble objects. The notification or alert can indicate a change of status of data comprising the one or more bubble objects for which attention may be needed from the individual or the financial institution. In some implementations, a status message providing details of the notification or alert can be superimposed on the bubble object image. In other implementations, details of the notification or alert can be displayed using a reader device for the bubble object image.

For the use case of a linked profile with family financial health index, a link can be created to family health information based on customer configuration preferences. The link can be a bar code, a QR code or another type of code. When the link is scanned information regarding the family financial health can be displayed.

For the use case of a calculation of a health index and displaying as a ring, a thickness and color of an outer ring of a bubble object image can indicate a financial health status of the individual. An example of an outer ring is shown by outer edge 202 of FIG. 2. A thin, pale red color ring can indicate that liabilities are greater than assets and a thick, green color ring can indicate that assets are greater than liabilities.

Figure 5:
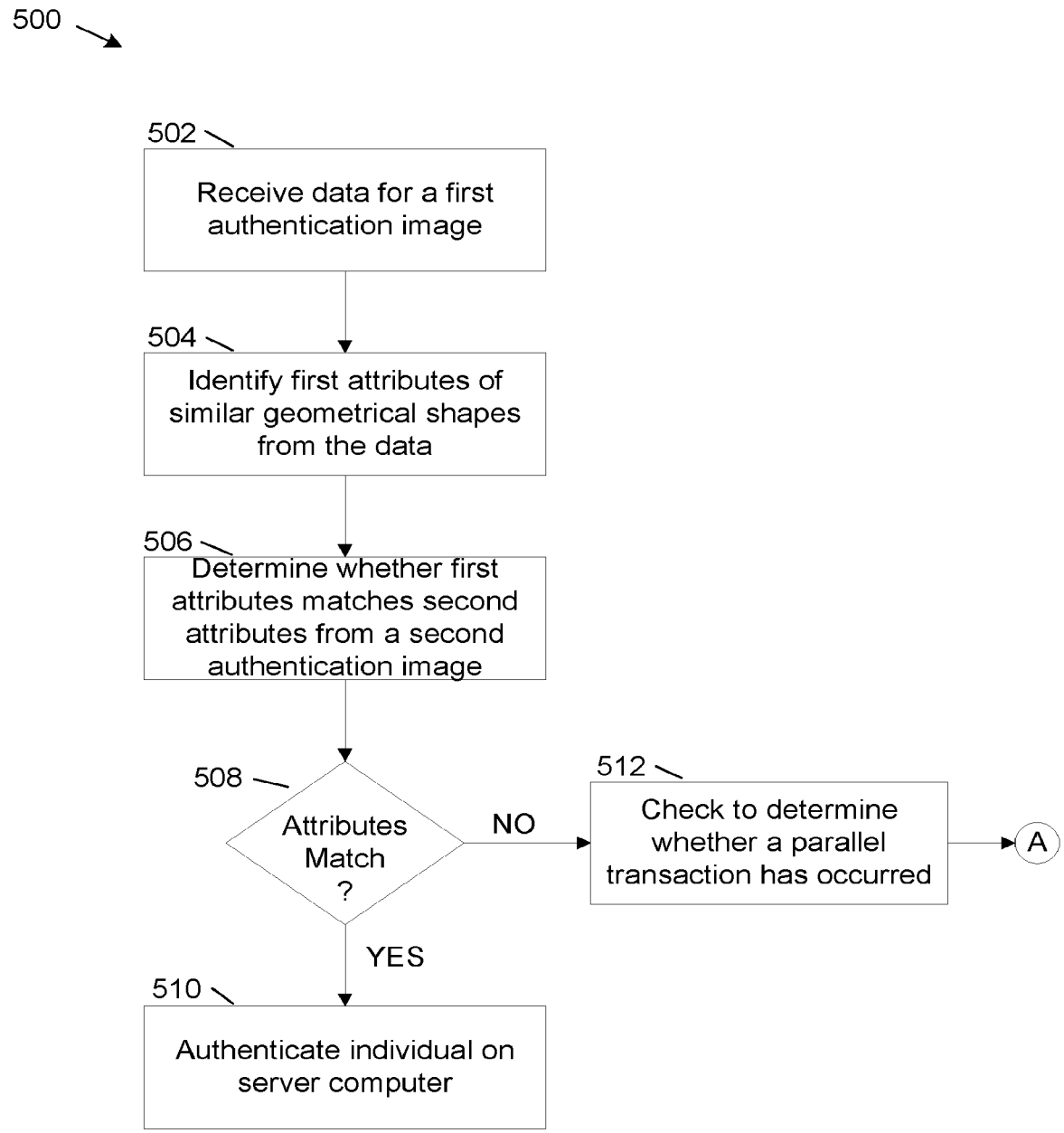
FIG. 5 shows a method for authenticating an individual at a server computer.

FIG. 5 shows a flowchart of an example method 500 for authenticating an individual at a server computer, for server computer 108. The individual is authenticated via a one-time password comprised of a bubble object image.

At operation 502, data is received from an electronic computing device for a first authentication image for the individual. The electronic computing device is an electronic computing device for the individual, such as a smartphone, tablet computer or laptop computer. The first authentication image is comprised of one or more bubble objects, each bubble object representing data for the individual. As discussed earlier herein, the data can include profile information for the individual, purchase transaction data for the individual, information regarding assets and liabilities for the individual and other information.

At operation 504, first attributes of similar geometrical shapes are identified from the received data. The similar geometrical shapes comprise shapes of bubble objects in the authentication image. Most commonly, the geometric shapes are circles, however other geometric shapes, for example squares and ellipses can be used. The first attributes comprises attributes for the bubble objects, such as x and y coordinates of the bubble objects, a radius of each bubble object when the bubble objects are circles and information regarding the specific bubble object. For example, when the bubble object comprises an asset for the individual, the information can include a description and a value of the asset. When the bubble object comprises a liability for the individual, such as a mortgage, the information can include the financial institution holding the mortgage and the outstanding balance of the mortgage. When the bubble object corresponds to an electronic purchase transaction, the information can include a date of the purchase, a description of the purchase and an amount of the purchase. Other information is possible.

At operation 506, a determination is made as to whether the first attributes of the bubble objects in the first authentication image match second attributes from a second authentication image. The second authentication image corresponds to an authentication image for the individual that was previously generated and stored on server computer 108, on a database, for example one of databases 112 or on another server computer or database accessible from server computer 108. The second authentication image is typically sent to the electronic computing device after being generated by server computer 108.

At operation 508, a determination is made as to whether the attributes match. When a determination is made as operation 508 that the attributes match, at operation 510, the individual is authenticated at server computer 108.

When a determination is made at operation 508 that the attributes do not match, at operation 512, a determination is made as to whether a parallel transaction may have occurred between the time that an OTP was generated at server computer 108 and the individual received the OTP. For example, if the individual initiates a transaction (referred to herein as a parallel transaction), before a new OTP is received, the OTP image sent by the customer electronic computing device would not match the new OTP image at server computer 108 and the attributes would not match at operation 508. The time taken to generate an OTP at server computer 108 and have the OTP received at the customer electronic computing device can take up to several seconds. In that time, the individual could have initiated the parallel transaction.

The check for parallel transactions at operation 512 comprises checking to determine whether any transactions are received at server computer 108 within a pre-determined time interval between generating the OTP image and receiving the OTP image back from the customer electronic computing device. The pre-determined time interval corresponds to a time determined for the customer electronic computing device to receive the OTP image and send the OTP image back to server computer 108 in a new transaction, for example 2 seconds.

Figure 6:
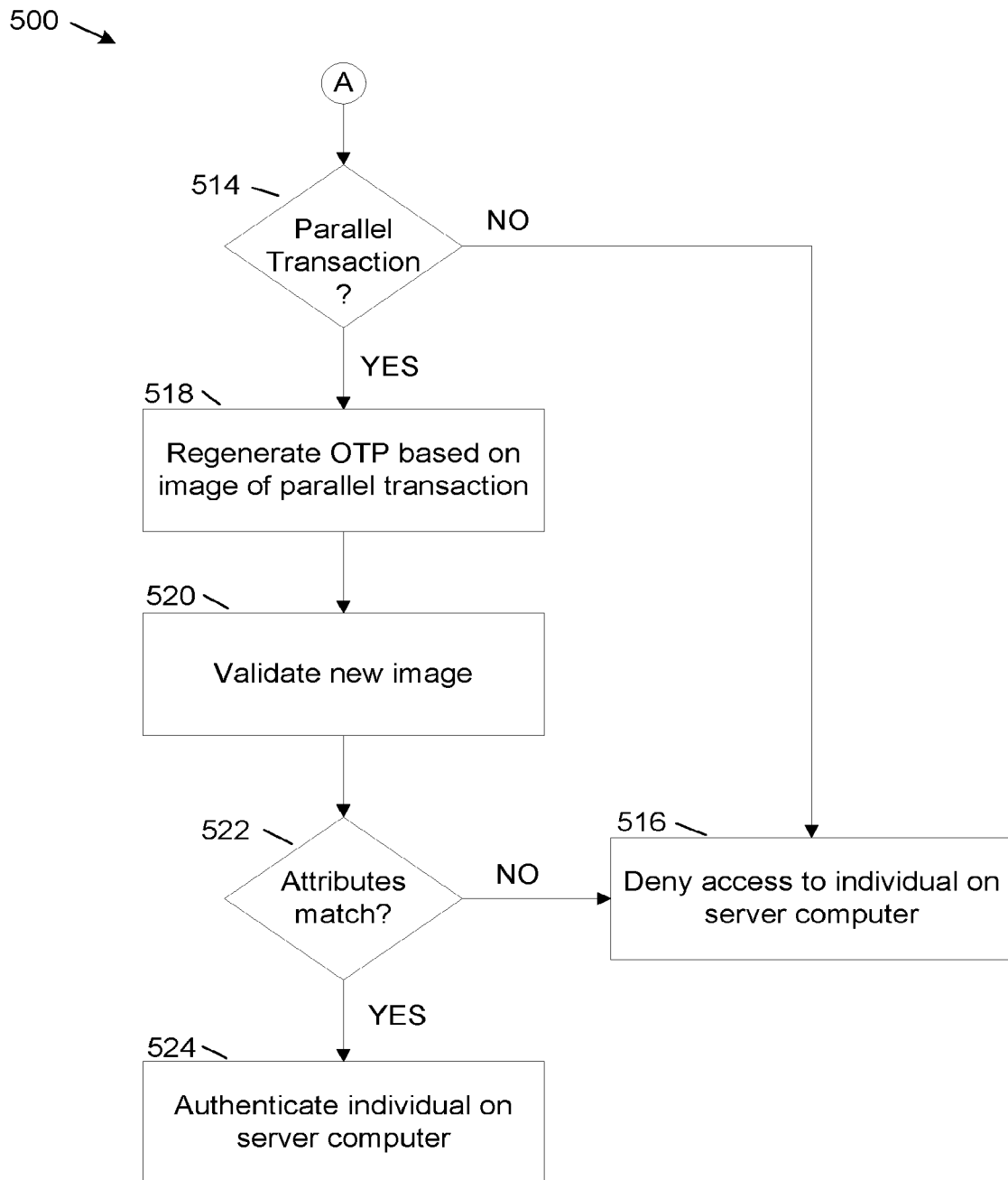
FIG. 6 shows a method for checking whether a parallel transaction occurred during the method of FIG. 5.

FIG. 6 shows a flowchart for an example method 512 for checking to determine whether a parallel transaction has occurred.

At operation 514, a determination is made as to whether a transaction was received within the predetermined time interval. When a determination is made at operation 514 that a transaction was not received within the predetermined time interval (i.e. a parallel transaction did not occur), this is an indication that the attribute mismatch detected at operation 508 is valid. Therefore, at operation 516, the individual is denied access to server computer 108.

When a determination is made at operation 514 that a parallel transaction did occur, at operation 518, server computer 108 regenerates the OTP based on the received OTP image. However, the regenerated OTP is not sent back to the customer electronic computing device.

At operation 520, the new received OTP image is validated with the regenerated OTP to determine whether attributes match.

At operation 522, when a determination is made that the attributes match, at operation 524, the individual is authenticated on server computer 108. However, at operation 522 when the attributes do not match, at operation 516, the individual is denied access to server computer 108.

Figure 7:
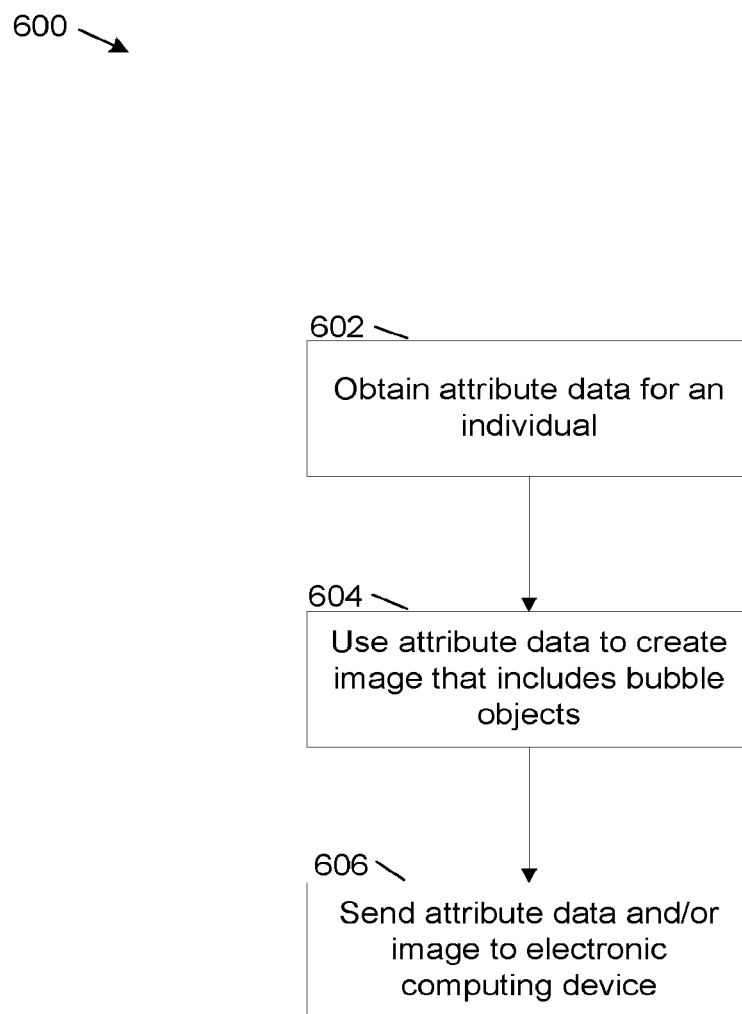
FIG. 7 shows a method for generating an authentication image for the individual.

FIG. 7 shows a flowchart of an example method 600 for generating an authentication image for the individual.

At operation 602, attribute data is obtained for the individual. The attribute data can comprise different types of data, such as data regarding a profile for the individual, assets and liabilities for the individual, data from electronic purchase transactions for the individual and other types of data.

At operation 604, an authentication image including bubble objects is created from the attribute data. Each bubble object in the authentication image can correspond to a specific type of attribute data. For example one or more bubble objects can correspond to an asset for the individual, another bubble object can correspond to a liability for the individual and another bubble object can correspond to electronic purchase transaction data for the individual.

Some bubble objects, for example a bubble object corresponding to electronic purchase transaction data, can be a concatenation of multiple electronic purchase transactions. For example the bubble object corresponding to electronic transaction data can include a layer for each of the multiple electronic purchase transactions. Specific details regarding each of the multiple electronic purchase transactions can be viewed using a reader device, for example a display device that can show depth, such as an Apple watch.

The authentication image including the bubble objects can be created using software on the server computer than can create the bubble objects from the authentication data and position each bubble object in an appropriate position in the authentication image. For example, in a typical implementation, as described earlier herein, assets can be positioned in a first quadrant of the bubble object (the upper right quadrant) and liabilities can be position in a third quadrant of the bubble object (the lower left quadrant).

At operation 606, the attribute data and/or the authentication image is sent to an electronic computing device, such as a smartphone, a tablet computer, a laptop computer or a desktop computer, for example one of electronic computing device 102 or electronic computing device 104. In some implementations, the authentication image is sent to the electronic computing device. In other implementations, the attribute data used to create the authentication image is sent to the electronic computing device, and the electronic computing device creates a copy of the authentication image using software similar to the software that server computer 108 uses to create the authentication image.

Figure 8:
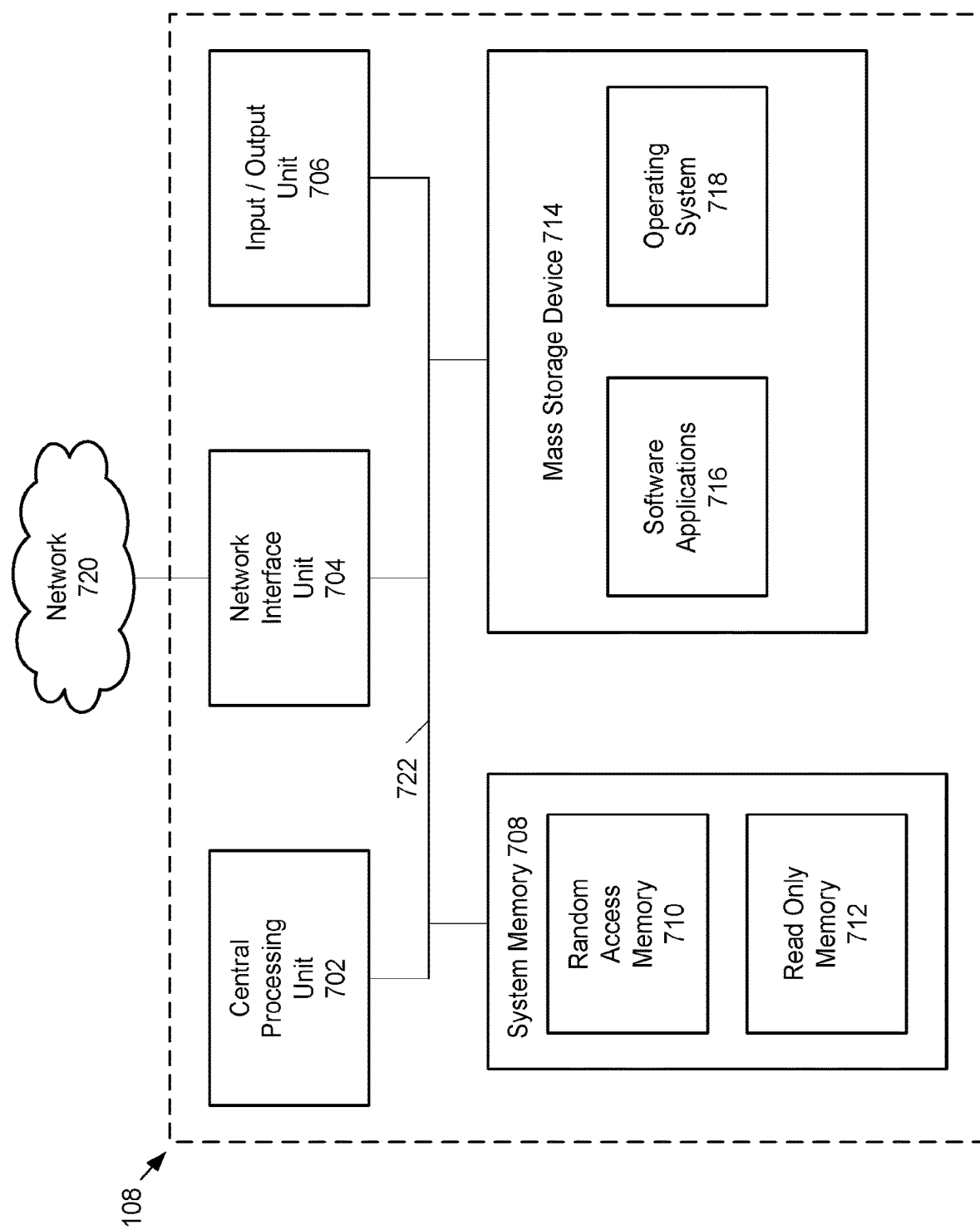
FIG. 8 shows example physical components of the electronic computing devices of FIG. 1.

As illustrated in the example of FIG. 8, server computer 108 includes at least one central processing unit ("CPU") 702, a system memory 708, and a system bus 722 that couples the system memory 708 to the CPU 702. The system memory 708 includes a random access memory ("RAM") 710 and a read-only memory ("ROM") 712. A basic input/output system that contains the basic routines that help to transfer information between elements within the server computer 108, such as during startup, is stored in the ROM 712. The server computer 108 further includes a mass storage device 714. The mass storage device 714 is able to store software instructions and data. Some or all of the components of the server computer 108 can also be included in electronic computing device 102 and electronic computing device 104.

The mass storage device 714 is connected to the CPU 702 through a mass storage controller (not shown) connected to the system bus 722. The mass storage device 714 and its associated computer-readable data storage media provide non-volatile, non-transitory storage for the server computer 108. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the server computer 108.

According to various embodiments of the invention, the server computer 108 may operate in a networked environment using logical connections to remote network devices through the network 720, such as a wireless network, the Internet, or another type of network. The server computer 108 may connect to the network 720 through a network interface unit 704 connected to the system bus 722. It should be appreciated that the network interface unit 704 may also be utilized to connect to other types of networks and remote computing systems. The server computer 108 also includes an input/output controller 706 for receiving and processing input from a number of other devices, including a touch user interface display screen, or another type of input device. Similarly, the input/output controller 706 may provide output to a touch user interface display screen or other type of output device.

As mentioned briefly above, the mass storage device 714 and the RAM 710 of the server computer 108 can store software instructions and data. The software instructions include an operating system 718 suitable for controlling the operation of the server computer 108. The mass storage device 714 and/or the RAM 710 also store software instructions, that when executed by the CPU 702, cause the server computer 108 to provide the functionality of the server computer 108 discussed in this document. For example, the mass storage device 714 and/or the RAM 710 can store software instructions that, when executed by the CPU 702, cause the server computer 108 to display received data on the display screen of the server computer 108.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:
1. An electronic computing device, comprising:
a processing unit; and
system memory, the system memory including instructions which, when executed by the processing unit, cause the electronic computing device to:
access financial information regarding an individual;
create an image comprising a plurality of first geometrical objects, wherein:
the plurality of first geometrical objects are circles;
the image is divided into four quadrants, a first quadrant on the upper right of the image, a second quadrant on the upper left of the image, a third quadrant on the lower left of the image, and a fourth quadrant on the lower right of the image;

a first bubble object of the plurality of first geometrical objects represents a first aspect associated with the financial information regarding the individual;
a second bubble object of the plurality of first geometrical objects represents a second aspect associated with the financial information regarding the individual; and
the first bubble object has a first size and is located at the first quadrant of the image and the second bubble object has a second size and is located at the second quadrant of the image, wherein a first distance between a tangent on the first bubble object and a center of the image is proportional to a first length of time since creation of the first bubble object and a second distance between a tangent on the second bubble object and the center of the image is proportional to a second length of time since creation of the second bubble object;
send attribute data, including image object size and image object location information, including image object positional coordinates, corresponding to each of the plurality of first geometrical objects to a second electronic computing device, wherein the attribute data is to be used for authentication of the individual;
receive a request from the second electronic computing device for the individual to be authenticated at the electronic computing device, the request including an authentication image with a plurality of second geometrical objects, each having an authentication image object size and an authentication image object location, including authentication image object positional coordinates, generated from the attribute data received from the electronic computing device;
compare the authentication image with the image, including determining whether the image object size and the image object positional coordinates of each of the plurality of first geometrical objects from the image corresponds to the authentication image object size and the authentication image object positional coordinates of each of the plurality of second geometrical objects from the authentication image; and
when the authentication image corresponds to the image, authenticate the individual at the electronic computing device.

2. The electronic computing device of claim 1, wherein the instructions stored in the system memory, when executed by the processing unit, further cause the electronic computing device to:
receive updated financial information regarding the individual;
modify the image by one or more of the plurality of first geometrical objects configured in the image to incorporate the updated financial information; and
use the image as modified for future authentication of the individual.

3. The electronic computing device of claim 2, wherein the instructions stored in the system memory, when executed by the processing unit, further cause the electronic computing device to send the image as modified.

4. The electronic computing device of claim 1, wherein the first size of the least one of the plurality of first geometrical objects changes dynamically based on a first dollar value of the first aspect of the financial information and wherein the second size of the least one of the plurality of first geometrical objects changes dynamically based on a second dollar value of the second aspect of the financial information.

5. The electronic computing device of claim 1, wherein the first aspect includes assets of the individual and the second aspect includes liabilities of the individual.

6. The electronic computing device of claim 5, wherein the image includes an outer ring that has a color representing the assets and the liabilities and a thickness corresponding to a degree to which the assets in the image are greater than the liabilities or to which the liabilities in the image are greater than the assets.

7. The electronic computing device of claim 1, wherein at least two of the plurality of first geometrical objects are of different colors or shadings.

8. The electronic computing device of claim 1, wherein at least one of the plurality of first geometrical objects is based on the individual's electronic transaction data.

9. The electronic computing device of claim 1, wherein at least one of the plurality of first geometrical objects overlaps both the first quadrant representing the first aspect and the second quadrant representing the second aspect.

10. A method implemented on an electronic computing device for generating an image for authenticating an individual, the method comprising:
accessing financial information regarding the individual;
creating the image comprising a plurality of first geometrical objects, wherein:
the plurality of first geometrical objects are circles;
the image is divided into four quadrants, a first quadrant on the upper right of the image, a second quadrant on the upper left of the image, a third quadrant on the lower left of the image, and a fourth quadrant on the lower right of the image;
a first bubble object the plurality of first geometrical objects represents a first aspect associated with the financial information regarding the individual;
a second bubble object the plurality of first geometrical objects represents a second aspect associated with the financial information regarding the individual; and
the first bubble object has a first size and is located at the first quadrant of the image and the second bubble object has a second size and is located at the second quadrant of the image, wherein a first distance between a tangent on the first bubble object and a center of the image is proportional to a first length of time since creation of the first bubble object and a second distance between a tangent on the second bubble object and the center of the image is proportional to a second length of time since creation of the second bubble object;
sending attribute data, including image object size and image object location information, including image object positional coordinates, corresponding to each of the plurality of first geometrical objects to a second electronic computing device, wherein the attribute data is to be used for authentication of the individual;
receiving a request from the second electronic computing device for the individual to be authenticated at the electronic computing device, the request including an authentication image with a plurality of second geometrical objects, each having an authentication image object size and an authentication image object location, including authentication image object positional coordinates, generated from the attribute data received from the electronic computing device;

comparing the authentication image with the image, including determining whether the image object size and the image object positional coordinates of each of the plurality of first geometrical objects from the image corresponds to the authentication image object size and the authentication image object positional coordinates of each of the plurality of second geometrical objects from the authentication image; and when the authentication image corresponds to the image, authenticating the individual at the electronic computing device.

11. The method of claim 10, further comprising:
receiving updated financial information regarding the individual;
modifying the image by one or more of the plurality of first geometrical objects configured in the image to incorporate the updated financial information; and
using the image as modified for future authentication of the individual.

12. The method of claim 11, further comprising sending the image as modified.

13. The method of claim 10, wherein the first size of the least one of the plurality of first geometrical objects changes dynamically based on a first dollar value of the first aspect of the financial information and wherein the second size of the least one of the plurality of first geometrical objects changes dynamically based on a second dollar value of the second aspect of the financial information.

14. The method of claim 10, wherein the first aspect includes assets of the individual and the second aspect includes liabilities of the individual.

15. The method of claim 14, wherein the image includes an outer ring that has a color representing the assets and the liabilities and a thickness corresponding to a degree to which the assets in the image are greater than the liabilities or to which the liabilities in the image are greater than the assets.

16. The method of claim 10, wherein at least two of the plurality of first geometrical objects are of different colors or shadings.

17. The method of claim 10, wherein at least one of the plurality of first geometrical objects is based on the individual's electronic transaction data.

18. The method of claim 10, wherein at least one of the plurality of first geometrical objects overlaps both the first quadrant representing the first aspect and the second quadrant representing the second aspect.

* * * * *